US006491059B2

(12) United States Patent
Kajitani

(10) Patent No.: US 6,491,059 B2
(45) Date of Patent: Dec. 10, 2002

(54) SMOOTH EXHAUST VALVE

(75) Inventor: Masao Kajitani, Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/932,937

(22) Filed: Aug. 21, 2001

(65) Prior Publication Data

US 2002/0027211 A1 Mar. 7, 2002

(30) Foreign Application Priority Data

Sep. 7, 2000 (JP) ........................................ 2000-271990

(51) Int. Cl.[7] ............................................ F16K 31/363
(52) U.S. Cl. .................... 137/530; 251/63.6; 251/335.3; 251/337
(58) Field of Search ................................. 137/530, 529, 137/528; 251/63.6, 63.5, 335.3, 337

(56) References Cited

U.S. PATENT DOCUMENTS

| | | | | |
|---|---|---|---|---|
| 2,665,711 A | * | 1/1954 | Parks | 251/367 |
| 4,135,697 A | * | 1/1979 | Brumm | 251/61.3 |
| 4,431,159 A | * | 2/1984 | Stubbs | 251/63.6 |
| 5,172,722 A | * | 12/1992 | Nishimura | 137/630 |
| 5,174,335 A | * | 12/1992 | Iwabuchi | 137/625.3 |
| 5,392,807 A | * | 2/1995 | Caudle et al. | 251/61.5 |
| 5,634,627 A | * | 6/1997 | Daido et al. | 251/63.6 |
| 5,678,595 A | * | 10/1997 | Iwabuchi | 251/335.3 |
| 5,848,608 A | * | 12/1998 | Ishigaki | 137/630 |

OTHER PUBLICATIONS

U.S. patent application Ser. No. 09/797,594, filed Mar. 5, 2001, pending.
U.S. patent application Ser. No. 09/932,937, filed Aug. 21, 2001, pending.
U.S. patent application Ser. No. 09/946,328, filed Sep. 6, 2001, pending.
U.S. patent application Ser. No. 09/947,515, filed Sep. 7, 2001, pending.

* cited by examiner

Primary Examiner—Henry C. Yuen
Assistant Examiner—John Bastianelli
(74) Attorney, Agent, or Firm—Oblon, Spivak, McClelland, Maier & Neustadt, P.C.

(57) ABSTRACT

A smooth exhaust valve includes a main flow path having a large cross-sectional area and an auxiliary flow path having a small cross-sectional area for connecting a first port and a second port in parallel, a main valve body for opening and closing the main flow path, an auxiliary valve body for opening and closing the auxiliary flow path, a first piston for opening and closing the main valve body, a second piston for opening and closing the auxiliary valve body, a first spring device for repulsing the main valve body in a valve-closing direction, a second spring device for repulsing the auxiliary valve body in a valve-closing direction, and an adjusting rod mounted to a valve casing so as to be operated from outside to move forward and rearward and for changing a compressed amount of the second spring device by operation of forward and rearward movements of the adjusting rod to adjust a repulsing force of the second spring device.

6 Claims, 5 Drawing Sheets

SMOOTH EXHAUST VALVE

TECHNICAL FIELD

The present invention relates to a smooth exhaust valve connected between a vacuum chamber and a vacuum pump and used for gradually reducing pressure in the vacuum chamber to vacuum pressure.

PRIOR ART

In general, if gas at atmospheric pressure or high pressure in a vacuum chamber is exhausted rapidly in reducing internal pressure of the vacuum chamber to vacuum pressure by a vacuum pump in a manufacturing process and the like of a semiconductor, a large amount of gas flows temporarily. As a result, gas turbulence occurs in the vacuum chamber, a cloud of particles deposited on a vacuum chamber inner wall or the like is raised, and the particles may be deposited on a workpiece.

Therefore, a vacuum valve having a main valve body having a large opening area and an auxiliary valve having a small opening area is disposed in a flow path connecting the vacuum chamber and the vacuum pump. After carrying out initial exhausting by applying air pressure to a piston of the auxiliary valve body to open the auxiliary valve body, air pressure is applied to a piston of the main valve body to open the main valve body to thereby change a gas inhalation amount in stages. In this case, opening accuracy of the auxiliary valve in the initial exhausting is extremely important in order to avoid gas turbulence in the vacuum chamber and precise control of an opening degree of the auxiliary valve is required.

In the above vacuum valve, on the other hand, the main valve body and the auxiliary valve body are respectively and constantly repulsed in valve-closing directions by return springs and the respective valve bodies open when air pressure operating forces applied to the pistons exceed the repulsing forces of the return springs.

However, because a repulsing force characteristic of the spring generally varies from product to product, it is extremely difficult to make a spring load applied to the valve body in every vacuum valve uniform when the spring is used as the above-described return spring for the main valve body or the auxiliary valve body. Especially in a case of the auxiliary valve of which high opening/closing accuracy is required, if the characteristic of the return spring varies, a deviation is generated in a control curve of the vacuum valve, which affects an input/output characteristic. Therefore, the return spring has to be replaced by one having spring accuracy conforming to specifications. However, because the return spring for the auxiliary valve is normally disposed in a narrow space inside the valve, the spring cannot be replaced without disassembling to fine parts in many cases and a replacing operation is extremely complicated. Moreover, because it is necessary to readjust a relationship between air pressure and a returning force of the auxiliary valve after the replacement, there are problems of enormous amounts of effort and time required before the vacuum valve is brought into operation and high cost.

DISCLOSURE OF THE INVENTION

It is an object of the present invention to provide a smooth exhaust valve in which a repulsing force of a return spring for an auxiliary valve body can be easily adjusted by an operation from outside without replacing the spring even if a repulsing force characteristic of the spring is slightly different from specifications to thereby accurately and stably control opening/closing of the auxiliary valve body.

To achieve the above object, according to the present invention, there is provided a smooth exhaust valve comprising: a first port to be connected to a vacuum chamber; a second port to be connected to a vacuum pump; a main flow path having a large cross-sectional area and an auxiliary flow path having a smaller cross-sectional area than the main flow path for connecting the first port and the second port in parallel; a main valve body for opening and closing the main flow path; an auxiliary valve body for opening and closing the auxiliary flow path; a first piston connected to the main valve body through a first shaft; a second piston connected to the auxiliary valve body through a second shaft; a main pressure operating chamber for applying air pressure in a valve-opening direction to the first piston; an auxiliary pressure operating chamber for applying air pressure in a valve-opening direction to the second piston; first spring means for repulsing the main valve body in a valve-closing direction; second spring means for repulsing the auxiliary valve body in a valve-closing direction; and an adjusting rod mounted to a valve casing so as to be operated from outside to move forward and rearward and for changing a compressed amount of the second spring means by operation of forward and rearward movements of the adjusting rod to adjust a repulsing force of the second spring means.

According to the invention having the above structure, because the repulsing force of the second spring means can be adjusted by changing the compressed amount of the second spring means by operating the adjusting rod by forward and rearward movements even if the repulsing force characteristic of the second spring means is slightly different from the specifications, it is unnecessary to replace the second spring means.

According to a concrete embodiment of the invention, the auxiliary flow path and the auxiliary valve body are incorporated in the main valve body, the second piston and the auxiliary pressure operating chamber are incorporated in the first piston, the second shaft is incorporated in the first shaft, the second spring means is provided between the second piston and a movable spring seat in the first piston, and the adjusting rod is screwed for moving forward and rearward down into the first piston with a tip end portion of the adjusting rod in contact with the movable spring seat and a base end portion of the adjusting rod projecting outside from the valve casing.

According to an embodiment of the invention, third spring means is provided in the first shaft as spring means for repulsing the auxiliary valve body in the valve-closing direction in addition to the second spring means.

According to another embodiment of the invention, the first piston has a connecting hole for connecting the main pressure operating chamber and the auxiliary pressure operating chamber and the valve casing has one operating port for supplying pressure air to the main pressure operating chamber.

According to yet another embodiment of the invention, the valve casing has first and second operating ports for individually supplying pressure air to the main pressure operating chamber and the auxiliary pressure operating chamber, the first operating port communicates with the main pressure operating chamber through a through hole provided to the valve casing, and the second operating port communicates with the auxiliary pressure operating chamber through a through hole provided in the valve casing and the first shaft.

In the invention, the main valve body is a poppet valve and the auxiliary valve body is a needle valve.

DETAILED DESCRIPTION

Figure 1:
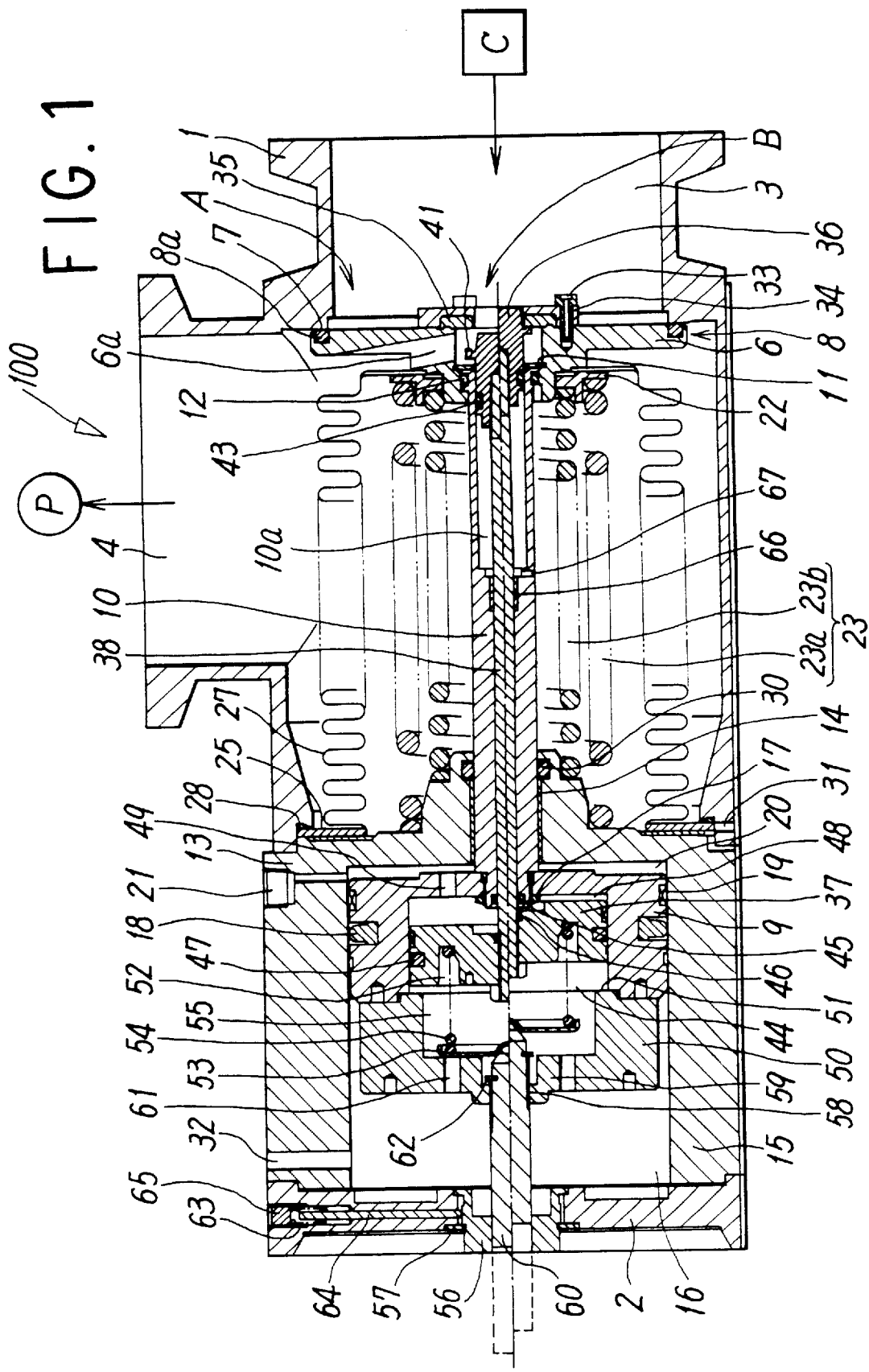
FIG. 1 is a sectional view showing a first embodiment of a smooth exhaust valve of the present invention and respectively showing open and closed states of a needle valve.
Figure 2:
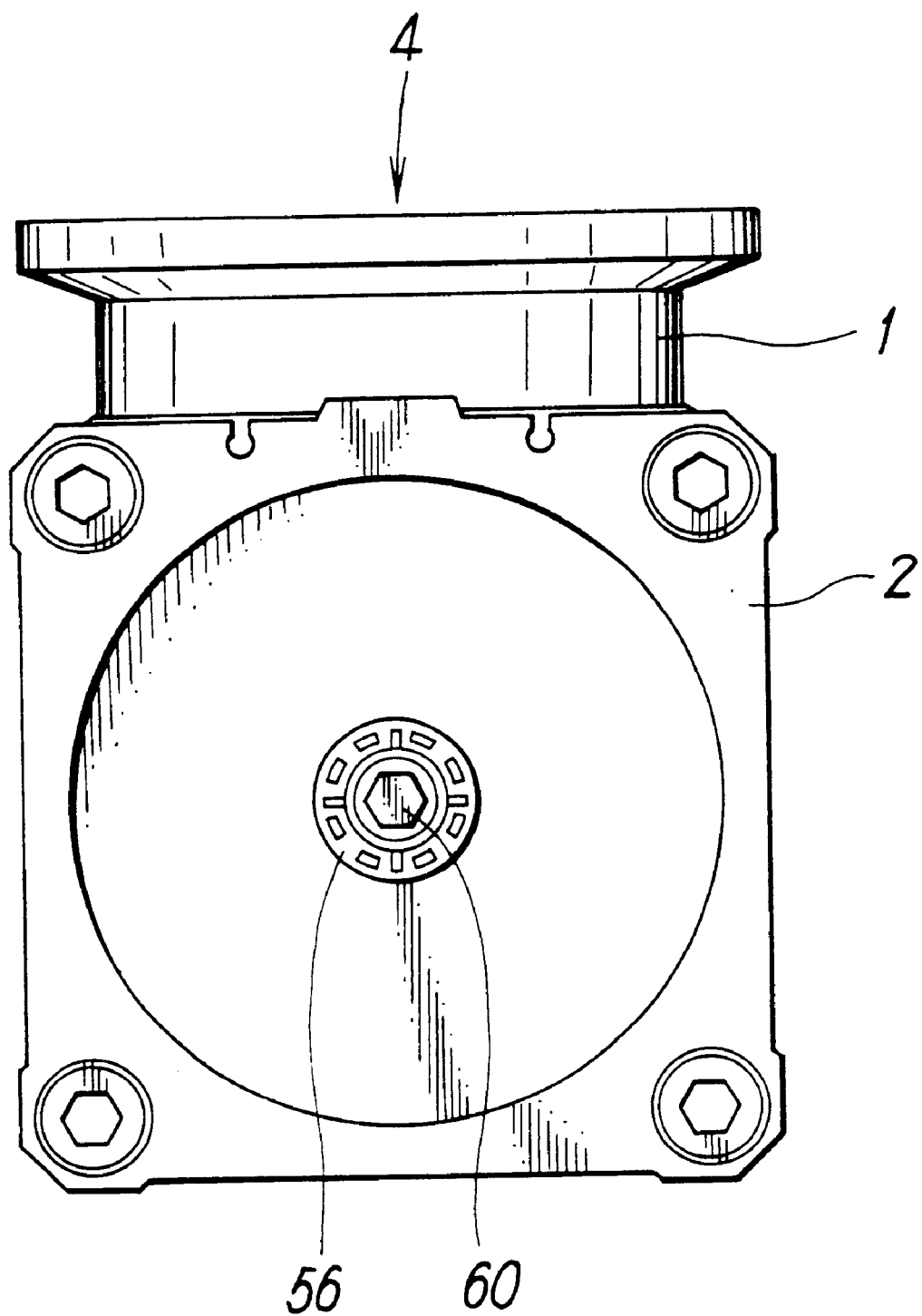
FIG. 2 is a side view of FIG. 1 showing a returning force adjusting portion of the needle valve.

Embodiments of the present invention will be described below in detail based on the drawings. A smooth exhaust valve 100 of a first embodiment shown in FIGS. 1 and 2 has a substantially cylindrical valve casing 1. An axial rear end portion of the casing 1 is closed with a cover 2, a first port 3 to be connected to a vacuum chamber C is formed at a tip end portion of the casing 1, and a second port 4 to be connected to a vacuum pump P is formed in a side face of the casing 1 in such a direction as to be orthogonal to an axis. In the casing 1, a main flow path A having a large cross-sectional area and an auxiliary flow path B having a small cross-sectional area for connecting the first port 3 and the second port 4 in parallel are provided respectively and a main valve mechanism for opening and closing the main flow path A and an auxiliary valve mechanism for opening and closing the auxiliary flow path B are provided respectively.

The main valve mechanism includes a main valve body 8 for opening and closing a first valve seat portion 7 in the main flow path A, a first piston 9 actuated by operation of air pressure to drive the main valve body 8, and a first shaft 10 for connecting the main valve body 8 and the first piston 9.

The main valve body 8 is formed by providing a sealing member 8a for opening and closing the first valve seat portion 7 to a peripheral edge portion of a disc-shaped first valve holder 6 having an open central portion. The central opening of the first valve holder 6 forms a part of the auxiliary flow path B and communicates with the second port 4 through an introducing passage 6a provided to the first valve holder 6. A tip end portion of the first shaft 10 is fitted and locked into the central portion of the first valve holder 6 and is fixed by a snap ring 11 so as not to come off. In the drawing, a reference numeral 12 designates a sealing member for maintaining airtightness between the first shaft 10 and the first valve holder 6.

A rear end portion of the first shaft 10 airtightly passes for sliding through a pedestal 13 in the casing 1 through a guide bushing 14 and a sealing member 30, projects into a first piston chamber 16 formed in a cylinder 15 between the pedestal 18 and the cover 2, and is airtightly connected to the first piston 9 disposed for sliding in the first piston chamber 16 by a nut 17.

The first piston 9 has on an outer periphery thereof packing 18 and a guide ring 19 which are airtightly in sliding contact with an inner wall of the first piston chamber 16. A main pressure operating chamber 20 defined between the first piston 9 and the pedestal 13 communicates with an operating port 21 formed in a side wall of the cylinder 15.

Therefore, if pressure air is supplied from the operating port 21 to the main pressure operating chamber 20, the first piston 9 moves rearward and the main valve body 8 opens. In this case, pressure air with pressure controlled by an electropneumatic regulator is supplied to the operating port 21.

In the casing 1, first spring means 23 formed of two coil springs 23a and 23b for repulsing the main valve body 8 in a closing direction is provided between a spring receiver 22 mounted to the first valve holder 6 and the pedestal 13 and a bellows 27 enveloping therein the first shaft 10 and the two springs 23a and 23b is provided between a bellows holder 25 sandwiched between the casing 1 and the pedestal 13 and the first valve holder 6. In the drawing, a reference numeral 28 designates a sealing member for maintaining airtightness between the casing 1 and the bellows holder 25. A reference numeral 31 designates a breathing port for connecting a space inside the bellows 27 to an outside and a reference numeral 32 designates a breathing port for connecting a breathing chamber behind the first piston 9 to the outside.

On the other hand, the auxiliary valve mechanism includes an auxiliary valve body 36 for opening and closing a second valve seat portion 35 in the auxiliary flow path B provided to the main valve body 8, a second piston 37 actuated by operation of air pressure to drive the auxiliary valve body 36, and a second shaft 38 for connecting the auxiliary valve body 36 and the second piston 37 to each other. These respective members are integrally incorporated into the main valve mechanism as can be understood from the following description.

In other words, the second valve seat portion 35 is mounted to an annular second valve holder 34 coaxially fixed to the first valve holder 6 through a fixing bolt 33. The auxiliary valve body 36 is formed of a needle valve. This needle valve 36 is formed in a gradually tapered shape, has on an outer periphery of the needle valve 36 a flange-shaped valve sealing portion 41 for coming in contact with and separating from the second valve seat portion 35, and is housed for sliding forward and rearward in a hollow portion 10a formed at the tip end portion of the first shaft 10. In the drawing, a reference numeral 67 designates a breathing hole for connecting a back chamber of the needle valve 36 to the outside and a reference numeral 43 designates a sealing member for maintaining airtightness between the first shaft 10 and the needle valve 36.

The second shaft 38 is airtightly inserted for sliding in the first shaft 10 and a rear end portion of the second shaft 38 projects into a second piston chamber 44 formed in the first piston 9 and is airtightly connected to the second piston 37 disposed for sliding in the second piston chamber 44. In the drawing, a reference numeral 45 designates a sealing member for maintaining airtightness between the second shaft 38 and the first shaft 10 and a reference numeral 46 designates a sealing member for maintaining airtightness between the second shaft 38 and the second piston 37. A reference numeral 66 designates a bushing disposed between the first shaft 10 and the second shaft 38 and the bushing 66 prevents deflection of the second shaft 38.

The second piston 37 has on an outer periphery thereof a sealing member 47 which is airtightly in sliding contact with an inner wall of the second piston chamber 44. An auxiliary pressure operating chamber 48 is defined between the second piston 37 and the first piston 9 on a front face side of the second piston 37 and the auxiliary pressure operating chamber 48 and the main pressure operating chamber 20 communicate with each other through a connecting hole 49 formed in the first piston 9.

The first piston 9 is integrally provided at a rear end portion thereof with a circular-cap-shaped piston cover 50. An inside diameter of the piston cover 50 is formed to be slightly smaller than an inside diameter of the first piston 9. A stopper 51 for restricting a stroke end of the second piston 37 is formed of an inside diameter end of the piston cover 50. In a chamber 55 positioned in the piston cover 50 and behind the second piston 37, a saucer-shaped movable spring seat 53 is disposed for moving forward and rearward with respect to the second piston 37. Second spring means 54 formed of a coil spring is provided between the spring seat 53 and an annular depression 52 in a back face of the second piston 37 and the second piston 37 is repulsed by the second spring means 54 in such a direction as to close the auxiliary valve body 36.

A screw hole 58 is formed in a central portion of a top face of the piston cover 50 and an adjusting rod 60 is screwed down into the screw hole 58 such that the adjusting rod 60 can move forward and rearward by rotation. A tip end portion of the adjusting rod 60 extends into the chamber 55 to be in contact with the movable spring seat 53 and an opposite base end portion of the adjusting rod 60 passes through a central portion of the cover 2 and extends outside the casing 1. A dial 56 having a knurled outer periphery is incorporated in the central portion of the cover 2 such that the dial 56 can be operated by rotation from outside the casing 1 and that the dial 56 is prevented from coming off by a snap ring 57. The adjusting rod 60 passes through the dial 56. There is such a relationship between the dial 56 and the adjusting rod 60 that they are movable with respect to each other in an axial direction and are connected to each other in a rotating direction. If the dial 56 is turned to operate the adjusting rod 60 by rotation, the adjusting rod 60 moves forward or rearward and the movable spring seat 53 moves forward/rearward. As a result, a compressed amount of the second spring means changes and a repulsing force of the second spring means is adjusted.

In the drawing, a reference numeral 61 designates a breathing hole for connecting the breathing chamber 55 behind the second piston 37 to a breathing chamber behind the first piston 9 and a reference numeral 62 designates a snap ring for preventing coming off of the adjusting rod 60 from the piston cover 50.

A needle 64 for preventing spontaneous rotation of the dial 56 is mounted to the cover 2. The needle 64 is inserted into a hole formed in the cover 2 and a tip end of the needle 64 is pushed against the knurled outer periphery of the dial 56 by a spring 63 disposed between the needle 64 and a setscrew 65.

In order to connect the adjusting rod 60 and the dial 56 only in the rotating direction as described above, the adjusting rod 60 and the dial 56 may be formed into a shaft and a hole in shapes of a square, a rectangle, a hexagon, or the like, formed into a round shaft and a circular hole with parts of side faces thereof flattened, or formed into a shaft and a hole in proper sectional shapes respectively having a groove and a projection engaged with each other in the rotating direction only, for example. However, other proper connecting mechanisms may be also used.

There is such relationships between piston diameters of the first piston 9 and the second piston 37 and between repulsing forces of the first spring means 23 and the second spring means 54 of the main valve mechanism and the auxiliary valve mechanism that the second piston 37 is actuated by lower air pressure than the first piston 9.

In the exhaust valve having the above structure, the main valve body 8 and the auxiliary valve body 36 are normally and respectively moved to closed positions of the valves by the repulsing forces of the first spring means 23 and the second spring means 54 to come in contact with the first valve seat portion 7 and the second valve seat portion 35 to thereby respectively close the main flow path A and the auxiliary flow path B. Therefore, if the vacuum pump P is operated in this state, gas in the vacuum chamber C is not discharged from the first port 3 into the second port 4.

If pressure air such as compressed air with controlled pressure is supplied from the operating port 21 to the main pressure operating chamber 20, the pressure air is also introduced into the auxiliary pressure operating chamber 48 through the connecting hole 49.

Then, if an air pressure operating force applied to the second piston 37 in the auxiliary pressure operating chamber 48 exceeds the repulsing force of the second spring means 54, the second piston 37 is actuated to open the needle valve 36 to a set opening degree through the second shaft 38. As a result, gas in the vacuum chamber C gradually flows into the second port 4 through the auxiliary flow path B which is open to a restricted degree and the vacuum chamber C is slowly exhausted of gas.

At this time, gas turbulence generated in a case of rapid exhausting is not generated in the vacuum chamber C and a cloud of particles is not raised by the turbulence. Overload due to temporary inhalation of a large amount of air by the vacuum pump P does not occur.

Here, an opening/closing characteristic of the needle valve 36 is determined by a relationship between the repulsing force of the second spring means 54 and the air pressure operating force applied to the second piston 37. If a repulsing force characteristic of the second spring means 54 is slightly different from specifications or has gone out of adjustment in the midst, the adjusting rod 60 is operated by rotation by using the dial 56 and the movable spring seat 53 is moved forward or rearward through the adjusting rod 60 to thereby change the compressed amount of the second spring means such that the repulsing force of the second spring means is adjusted to conform to the specifications. Therefore, it is unnecessary to disassemble the exhaust valve and to replace the second spring means 54 and the repulsing characteristic of the second spring means 54 can be easily adjusted to conform to the specifications only by operation from outside.

Then, if the air pressure in the main pressure operating chamber 20 increases and if an air pressure operating force applied to the first piston 9 exceeds the repulsing force of the first spring means 23, the first piston 9 is actuated to move the first shaft 10 rearward to a position where the first shaft 10 comes in contact with the cover 2 against the repulsing force of the first spring means 23 and to open the main valve body 8. As a result, the main flow path A with the large cross-sectional area opens and remaining exhausting is carried out. Because a density of air is low at this time, turbulence is not generated if the air is inhaled at a measure of speed and raising of the cloud of particles is not caused. Needless to say, overload of the vacuum pump P is not caused either.

If air pressure from the operating port 21 is reduced after a necessary degree of vacuum of the vacuum chamber C is obtained, the main valve body 8 closes the main flow path A when the air pressure operating force applied to the first piston 9 becomes smaller than the repulsing force of the first spring means 23 and the auxiliary valve body 36 then closes the auxiliary flow path B when the air pressure operating force applied to the second piston 37 becomes smaller than the repulsing force of the second spring means 54.

Figure 3:
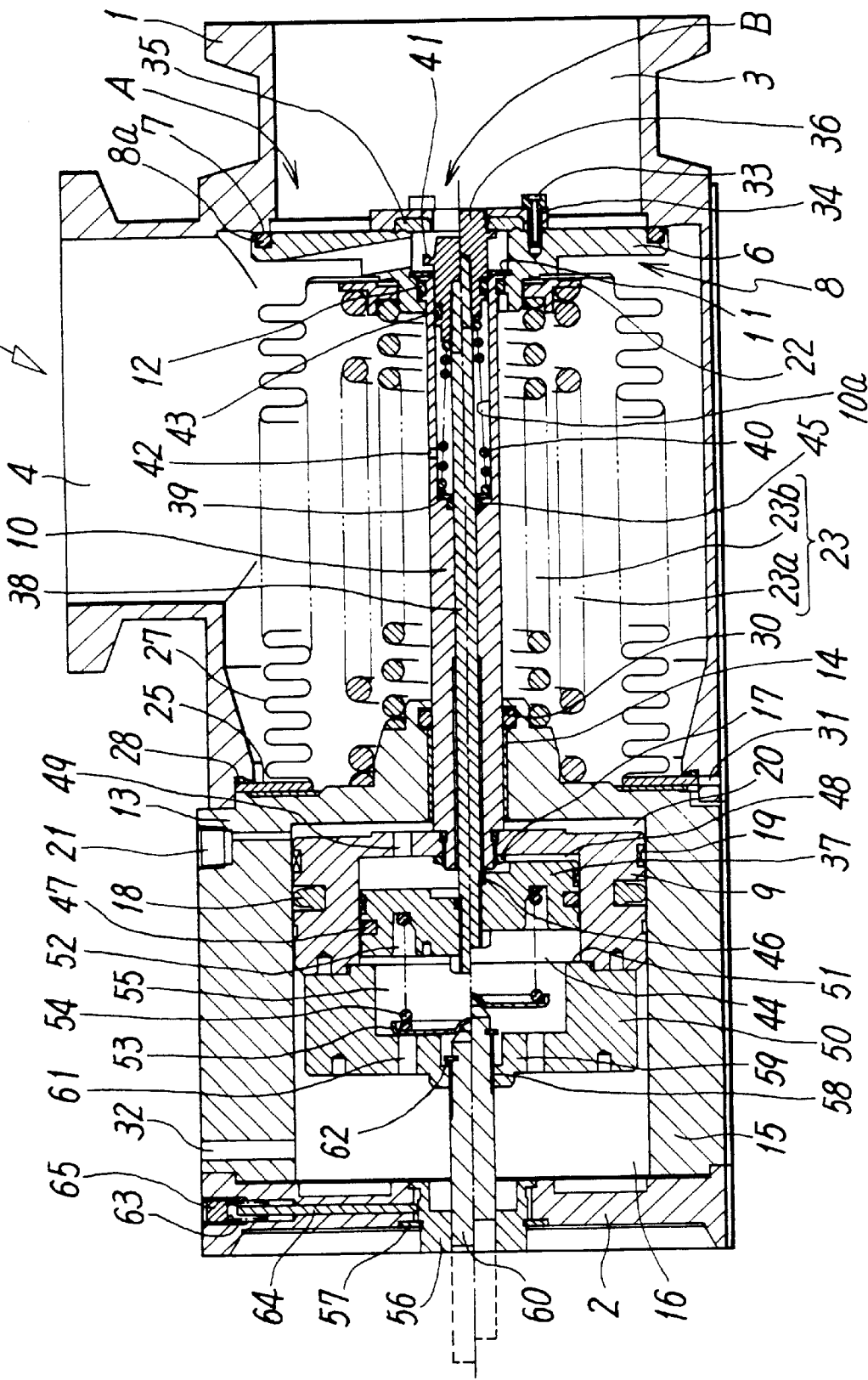
FIG. 3 is a sectional view showing a second embodiment of the smooth exhaust valve of the invention and respectively showing open and closed states of the needle valve.

An exhaust valve 200 of a second embodiment shown in FIG. 3 is provided with third spring means 40 in the first shaft 10 as spring means for repulsing the auxiliary valve body 36 in the valve-closing direction in addition to the second spring means 54. In other words, in the hollow portion 10a in the first shaft 10 where the auxiliary valve body 36 is housed, the third spring means 40 formed of a coil spring is disposed between a spring seat 39 locked to the first shaft 10 and the auxiliary valve body 36. By both the third spring means 40 and the second spring means 54, the auxiliary valve body 36 is repulsed in the valve-closing direction. Therefore, the third spring means 40 forms a part of the second spring means 54 in functional terms. In the drawing, a reference numeral 42 designates a breathing hole for allowing a back chamber of the auxiliary valve body 36 to open to the outside.

Because structures of the second embodiment other than those described above are substantially similar to those of the first embodiment, the main similar components are provided with similar reference numerals to omit description of the components.

Figure 4:
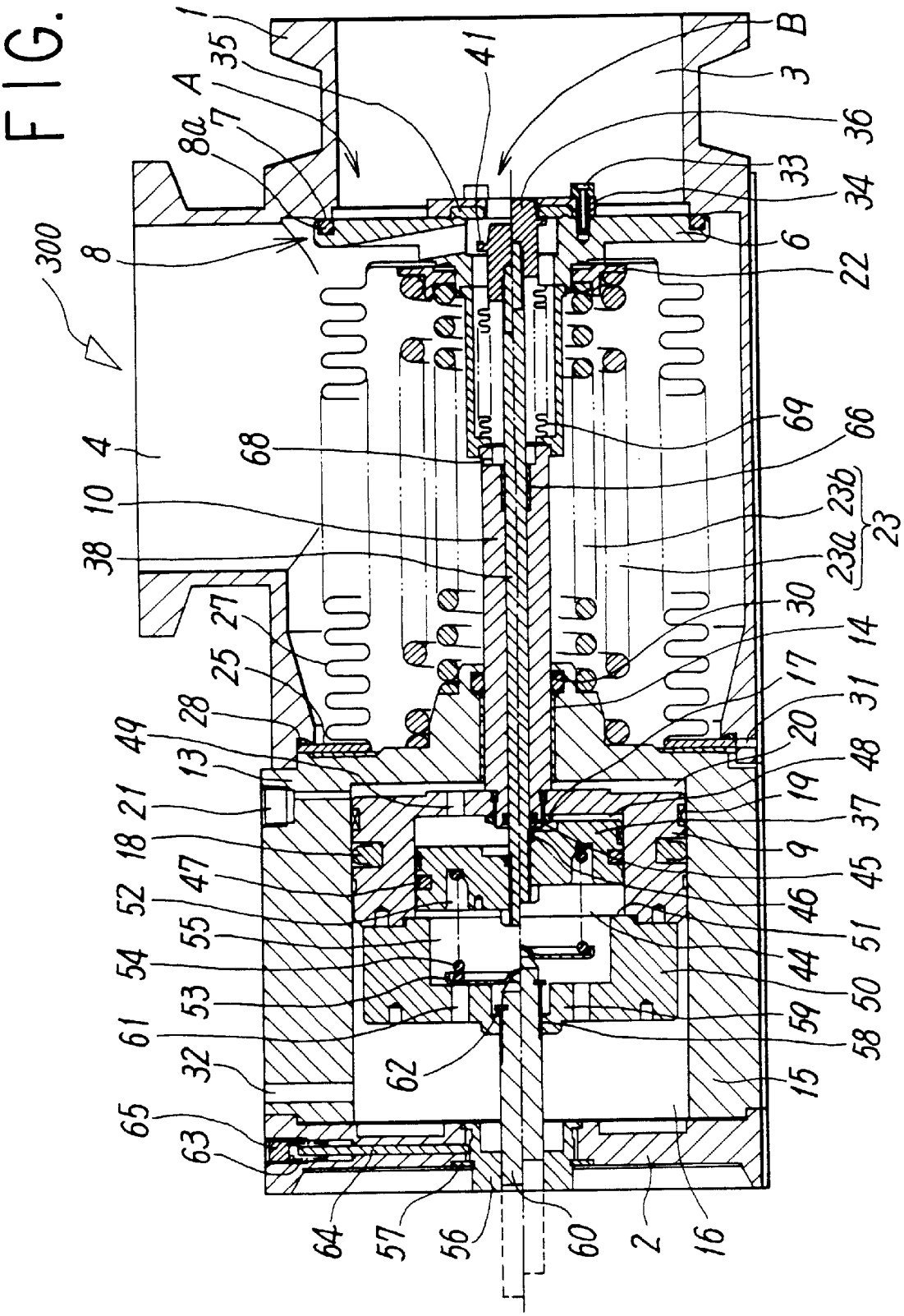
FIG. 4 is a sectional view showing a third embodiment of the smooth exhaust valve of the invention and respectively showing open and closed states of the needle valve.

FIG. 4 shows a third embodiment of the exhaust valve. The exhaust valve 300 of the third embodiment is different from the exhaust valve 100 of the first embodiment in that a bellows 69 is used in the exhaust valve 300 while the sealing member 43 is used for maintaining airtightness between the auxiliary valve body 36 and the first shaft 10 in the exhaust valve 100 of the first embodiment. By using the bellows 69 instead of the sealing member 43 as described above, it is possible to prevent generation of hysteresis and dust due to sliding contact of the sealing member 43 with the first shaft 10. Because structures of the third embodiment other than those described above are substantially similar to those of the first embodiment, the main similar components are provided with similar reference numerals to omit description of the components.

Figure 5:
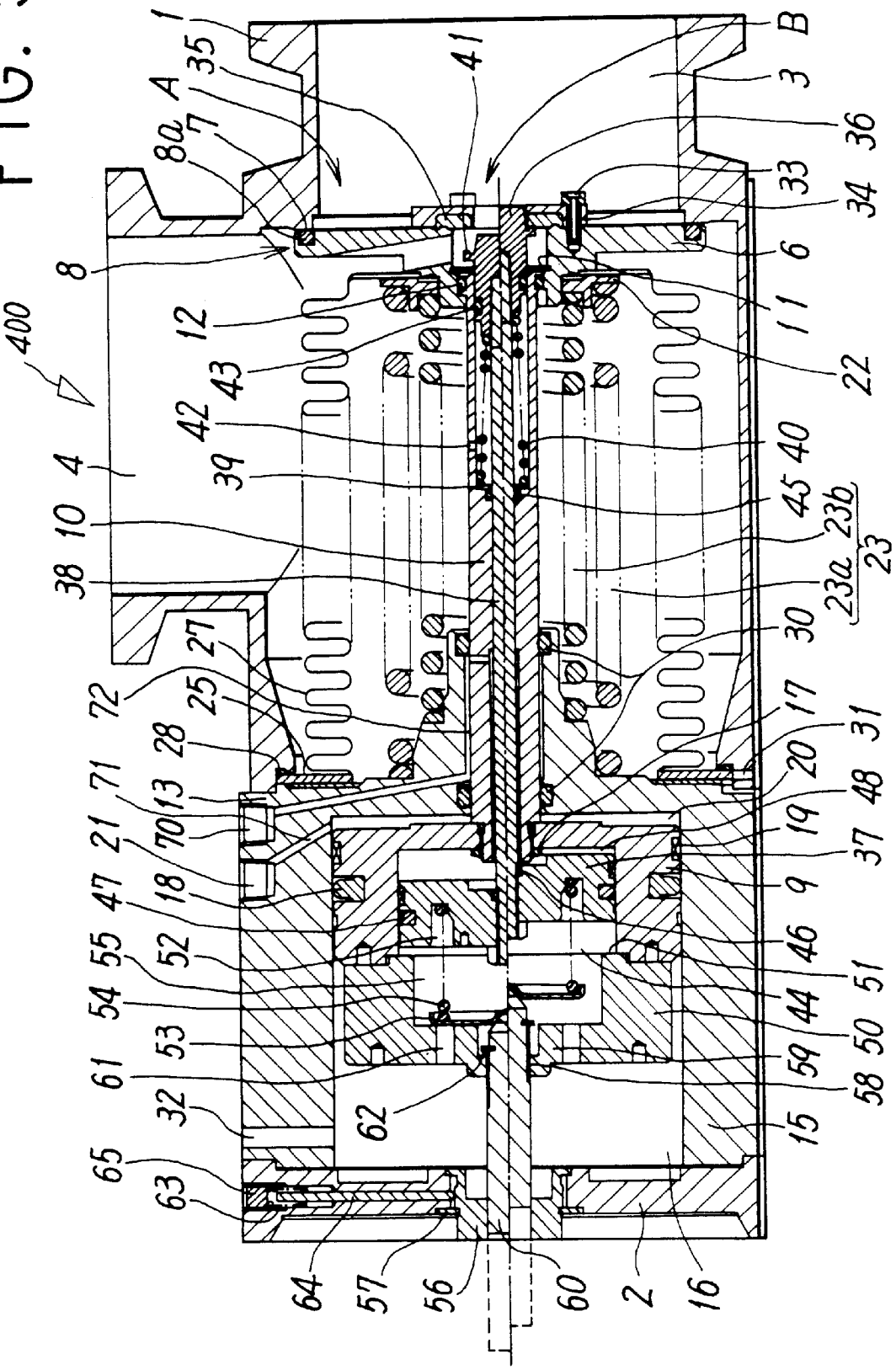
FIG. 5 is a sectional view showing a fourth embodiment of the smooth exhaust valve of the invention and respectively showing open and closed states of the needle valve.

FIG. 5 shows a fourth embodiment of the exhaust valve. The exhaust valve 400 of the fourth embodiment is different from the exhaust valve 200 of the second embodiment in that pressure air is individually supplied to the main pressure operating chamber 20 and the auxiliary pressure operating chamber 48 from a first operating port 21 and a second operating port 70 in the exhaust valve 400 of the fourth embodiment while the main pressure operating chamber 20 and the auxiliary pressure operating chamber 48 communicate with each other through the connecting hole 49 formed in the first piston 9 and pressure air is supplied from the one common operating port 21 to the main pressure operating chamber 20 and the auxiliary pressure operating chamber 48 in the exhaust valve 200 of the second embodiment. In other words, the first operating port 21 and the second operating port 70 are formed on the side face of the cylinder 15 in the valve casing 1, the first operating port 21 communicates with the main pressure operating chamber 20 through a through hole 71 provided to the cylinder 15, and the second operating port 70 communicates with the auxiliary pressure operating chamber 48 though a through hole 72 provided in the cylinder 15 and the first shaft 10. Therefore, the main pressure operating chamber 20 and the auxiliary pressure operating chamber 48 do not communicate with each other.

Because structures of the fourth embodiment other than those described above are substantially similar to those of the second embodiment, the main similar components are provided with similar reference numerals to omit description of the components. Although the auxiliary valve 36 is repulsed by the third spring means 40 in the fourth embodiment, it is also possible to omit the third spring means 40 as in the first embodiment or it is also possible to provide the bellows 69 instead of the third spring means 40 as in the third embodiment.

As described above, according to the invention, if the repulsing force characteristic of the second spring means for repulsing the auxiliary valve body is slightly different from specifications, the repulsing force of the second spring means can be easily adjusted to conform to the specifications by only operating the adjusting rod by rotation from outside to adjust the compressed amount of the spring. Therefore, it is unnecessary to disassemble the exhaust valve to replace the spring.

What is claimed is:

1. A smooth exhaust valve comprising:
   a first port to be connected to a vacuum chamber; a second port to be connected to a vacuum pump;
   a main flow path having a large cross-sectional area and an auxiliary flow path having a smaller cross-sectional area than said main flow path for connecting said first port and said second port in parallel;
   a main valve body for opening and closing said main flow path; an auxiliary valve body for opening and closing said auxiliary flow path;
   a first piston connected to said main valve body through a first shaft; a second piston connected to said auxiliary valve body through a second shaft;
   a main pressure operating chamber for applying air pressure in a valve-opening direction to said first piston; an auxiliary pressure operating chamber for applying air pressure in a valve-opening direction to said second piston;
   first spring means for repulsing said main valve body in a valve-closing direction; second spring means for repulsing said auxiliary valve body in a valve-closing direction; and
   an adjusting rod mounted to a valve casing so as to be operated from outside to move forward and rearward and for changing a compressed amount of said second spring means by operation of forward and rearward movements of said adjusting rod to adjust a repulsing force of said second spring means.

2. A smooth exhaust valve according to claim 1, wherein said auxiliary flow path and said auxiliary valve body are incorporated in said main valve body, said second piston and said auxiliary pressure operating chamber are incorporated in said first piston, said second shaft is incorporated in said first shaft, said second spring means is provided between said second piston and a movable spring seat in said first piston, and said adjusting rod is screwed for moving forward and rearward down into said first piston with a tip end portion of said adjusting rod in contact with said movable spring seat and a base end portion of said adjusting rod projecting outside from said valve casing.

3. A smooth exhaust valve according to claim 2, wherein third spring means is provided in said first shaft as spring means for repulsing said auxiliary valve body in said valve-closing direction in addition to said second spring means.

4. A smooth exhaust valve according to claim 2, wherein said first piston has a connecting hole for connecting said main pressure operating chamber and said auxiliary pressure operating chamber and said valve casing has one operating port for supplying pressure air to said main pressure operating chamber.

5. A smooth exhaust valve according to claim 2, wherein said valve casing has first and second operating ports for individually supplying pressure air to said main pressure operating chamber and said auxiliary pressure operating chamber, said first operating port communicates with said main pressure operating chamber through a through hole provided to said valve casing, and said second operating port communicates with said auxiliary pressure operating chamber through a through hole provided in said valve casing and said first shaft.

6. A smooth exhaust valve according to claim 2, wherein said main valve body is a poppet valve and said auxiliary valve body is a needle valve.

* * * * *